Figure 1:
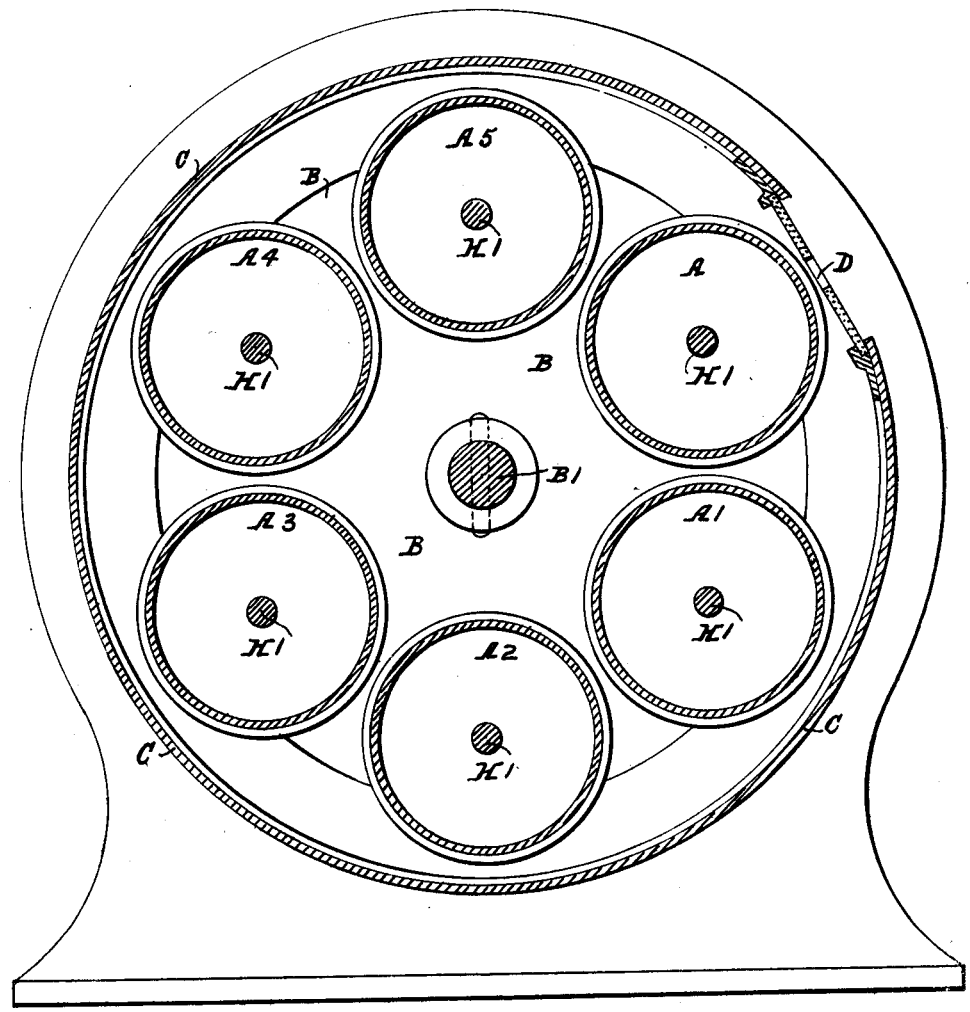

J. ROBERTSON.
RECKONING AND COMPUTING APPARATUS.
APPLICATION FILED APR. 2, 1910.

1,052,276.

Patented Feb. 4, 1913.
8 SHEETS—SHEET 1.

WITNESSES
L. H. Grote
W. E. Keir

INVENTOR
James Robertson
BY
Howson and Howson
his ATTORNEYS

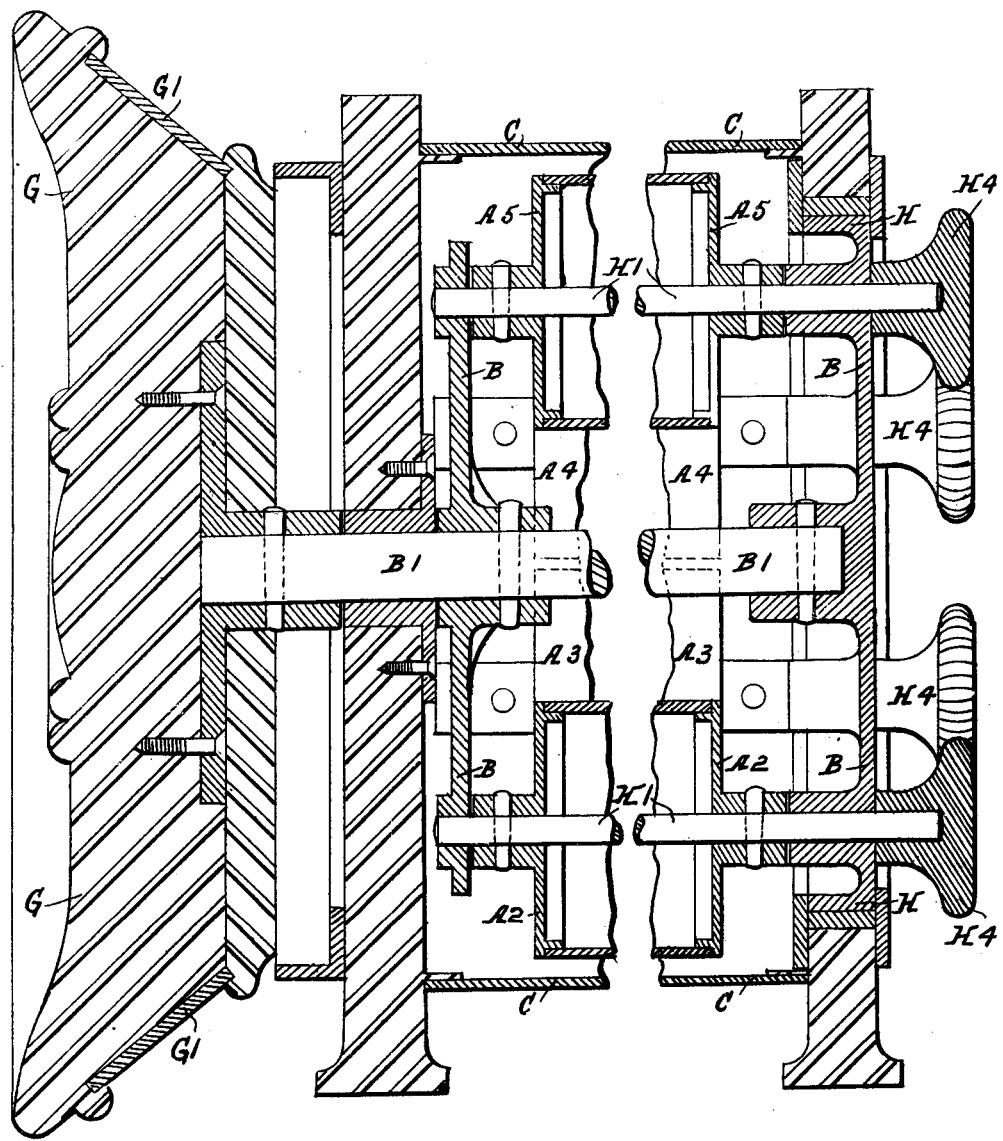

J. ROBERTSON.
RECKONING AND COMPUTING APPARATUS.
APPLICATION FILED APR. 2, 1910.
1,052,276.
Patented Feb. 4, 1913.
8 SHEETS—SHEET 3.
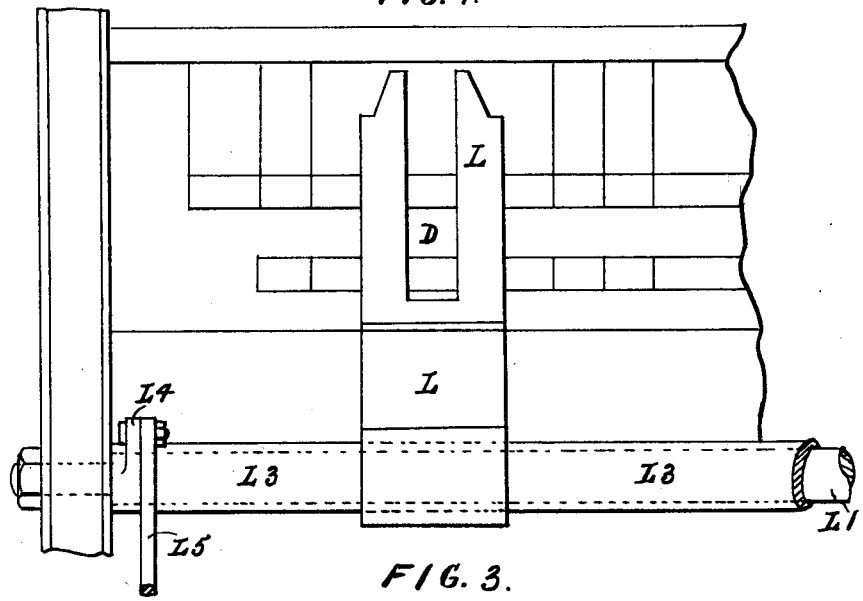
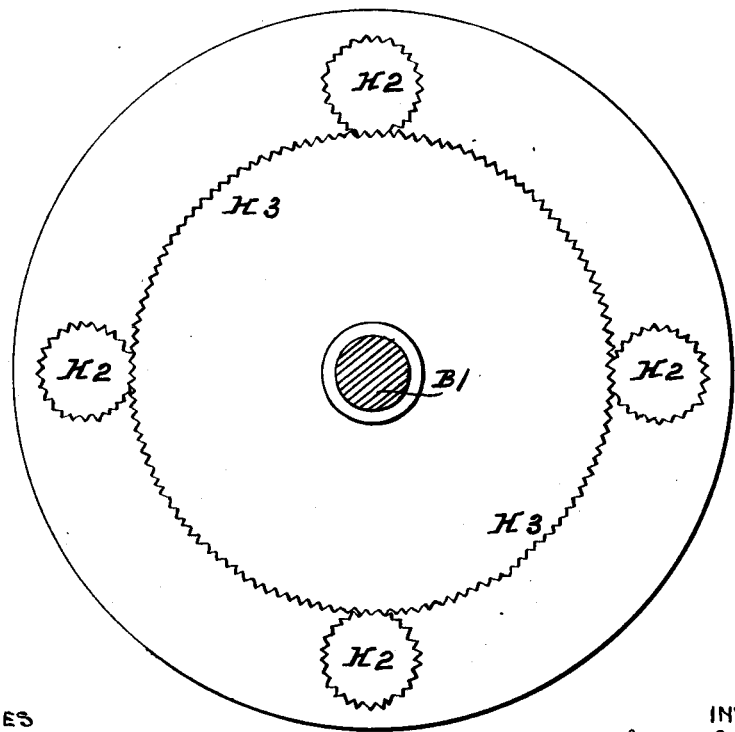

J. ROBERTSON.
RECKONING AND COMPUTING APPARATUS.
APPLICATION FILED APR. 2, 1910.
1,052,276.
Patented Feb. 4, 1913.
8 SHEETS—SHEET 4.
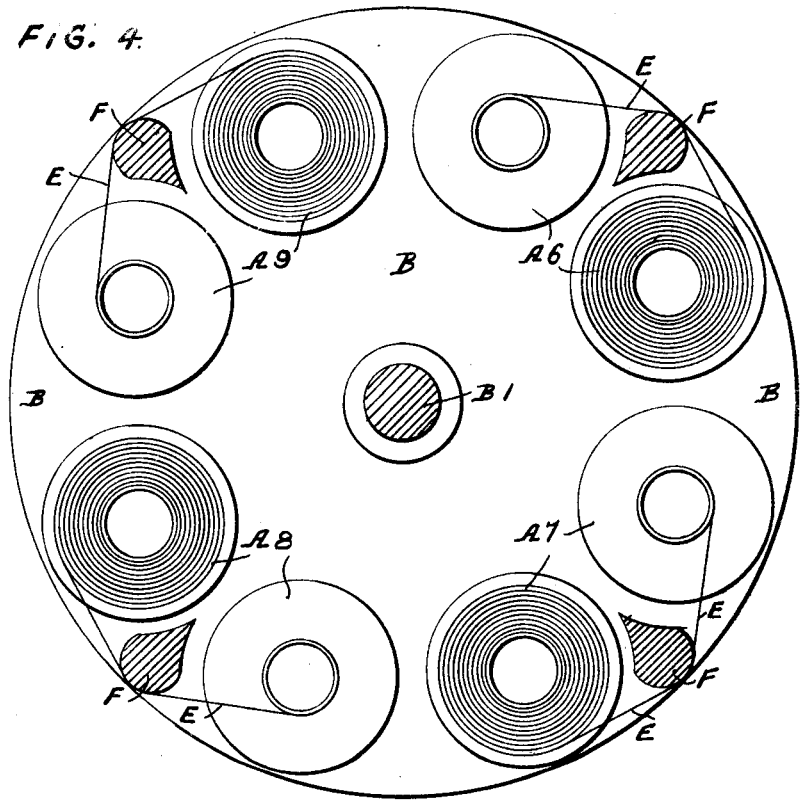
WITNESSES
INVENTOR
James Robertson
BY
Howson and Howson
his ATTORNEYS

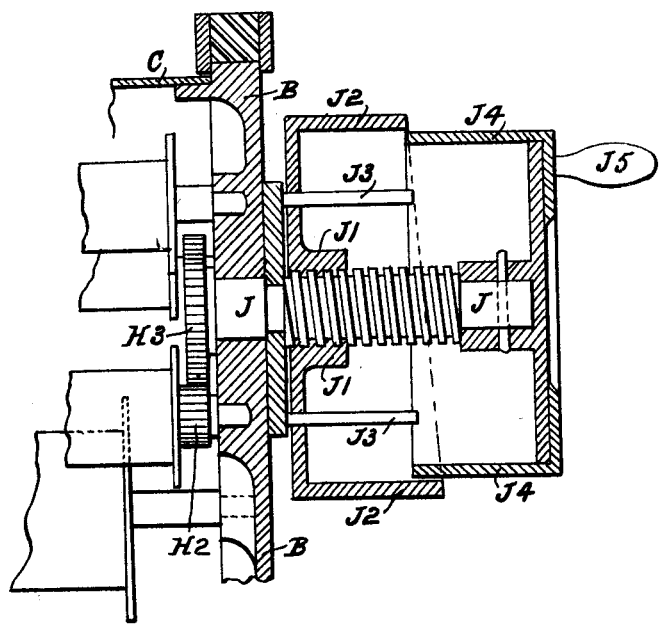
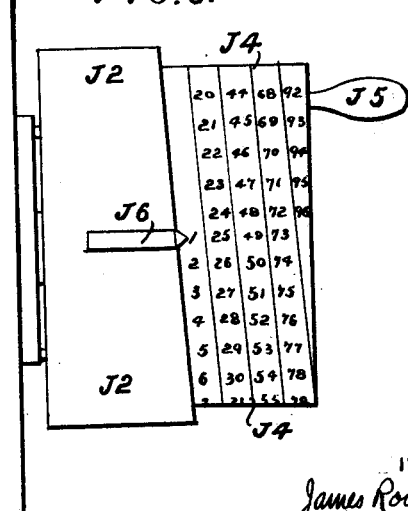

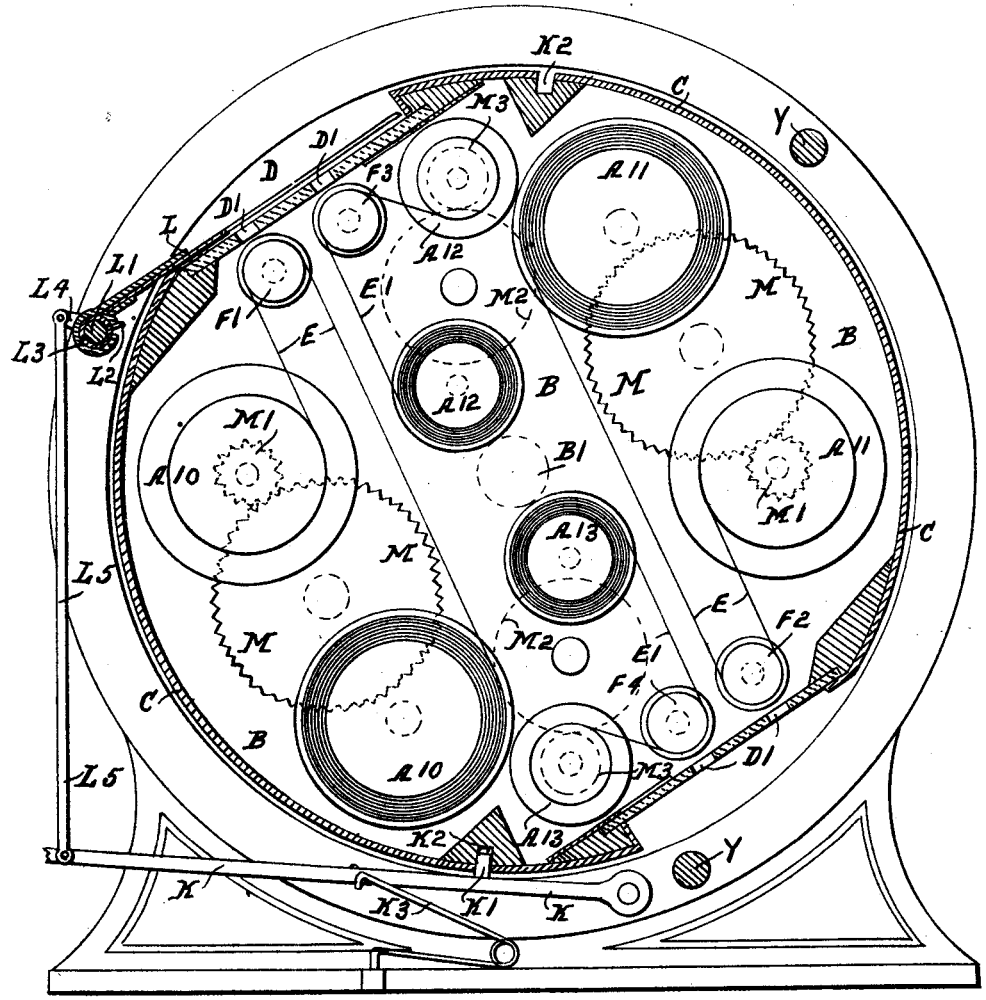

J. ROBERTSON.
RECKONING AND COMPUTING APPARATUS.
APPLICATION FILED APR. 2, 1910.

1,052,276.

Patented Feb. 4, 1913.

3 SHEETS—SHEET 7.

WITNESSES
L. H. Grote
W. E. Keir

INVENTOR
James Robertson
BY
Howson and Howson
ATTORNEYS

J. ROBERTSON.
RECKONING AND COMPUTING APPARATUS.
APPLICATION FILED APR. 2, 1910.
1,052,276.
Patented Feb. 4, 1913.
8 SHEETS—SHEET 8.
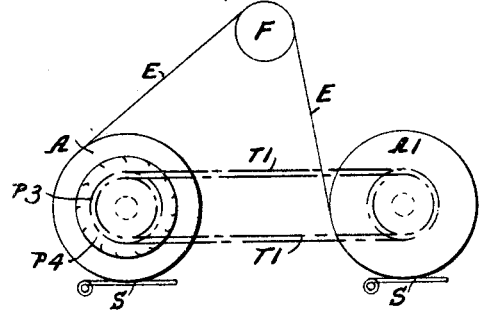
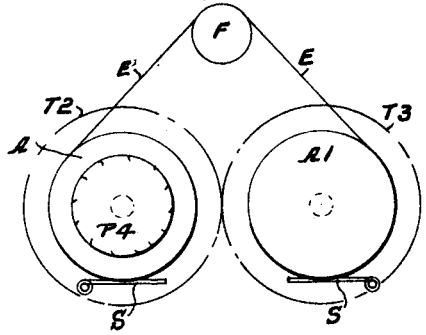
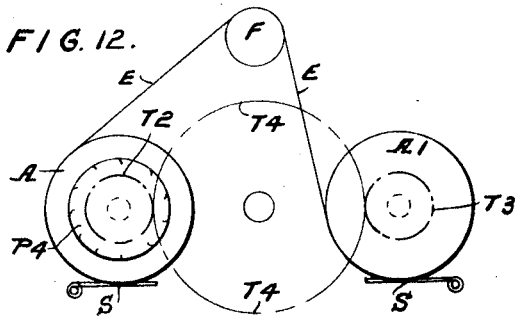
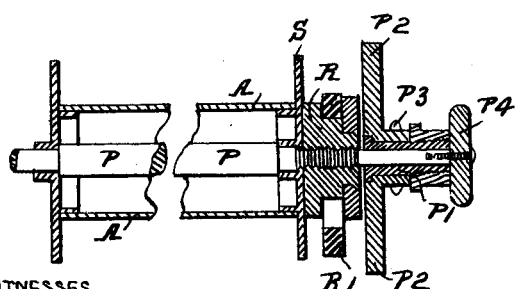
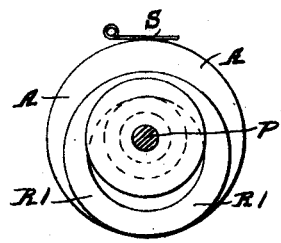
INVENTOR
James Robertson
BY
Howson and Howson
ATTORNEYS
WITNESSES

UNITED STATES PATENT OFFICE.

JAMES ROBERTSON, OF GLASGOW, SCOTLAND.

RECKONING AND COMPUTING APPARATUS.

1,052,276.　　　　　Specification of Letters Patent.　　Patented Feb. 4, 1913.

Application filed April 2, 1910. Serial No. 553,131.

*To all whom it may concern:*

Be it known that I, JAMES ROBERTSON, a subject of the King of Great Britain and Ireland, and a resident of Glasgow, Scotland, have invented certain new and useful Improvements in Reckoning and Computing Apparatus, and of which the following is the specification.

This invention relates to that type of reckoning and computing apparatus in which bands inscribed with factors or the like are mounted upon rotatable rollers and are brought beneath a pointer or equivalent by rotation of the rollers, while another factoring device may simultaneously give an indication. In such machines hitherto the capacity has been limited both by the limitation of length of the band and of smallness of size of the matter printed upon it.

The present invention has for its object to overcome these disabilities and to provide in one apparatus and readable against one pointer or equivalent a series of bands of such a total length as will permit of the most extended computations being made.

An apparatus made according to the invention, comprises essentially an outer casing provided with the usual pointer and scale and other devices, and having mounted within it a cage in which are a series of rollers carrying a series of bands any one of which by rotation of the cage may be brought opposite the pointer or like device, and which upon rotation of its roller or rollers may be made to there display its particular columns of factors. The factorial bands may be mounted directly about the peripheries of the rollers—there being then but one roller for each band,—or opposite ends of the bands may be attached to two rollers from one to the other of which they are wound to expose their columns. In this case means are provided for tensioning the bands, while the invention includes various minor devices appendant to the carrying out of its broad features.

In order that the invention and the manner of performing the same may be properly understood, there are hereunto appended eight sheets of explanatory drawings showing more or less diagrammatically a series of examples of the carrying out of the invention.

Figure 9:
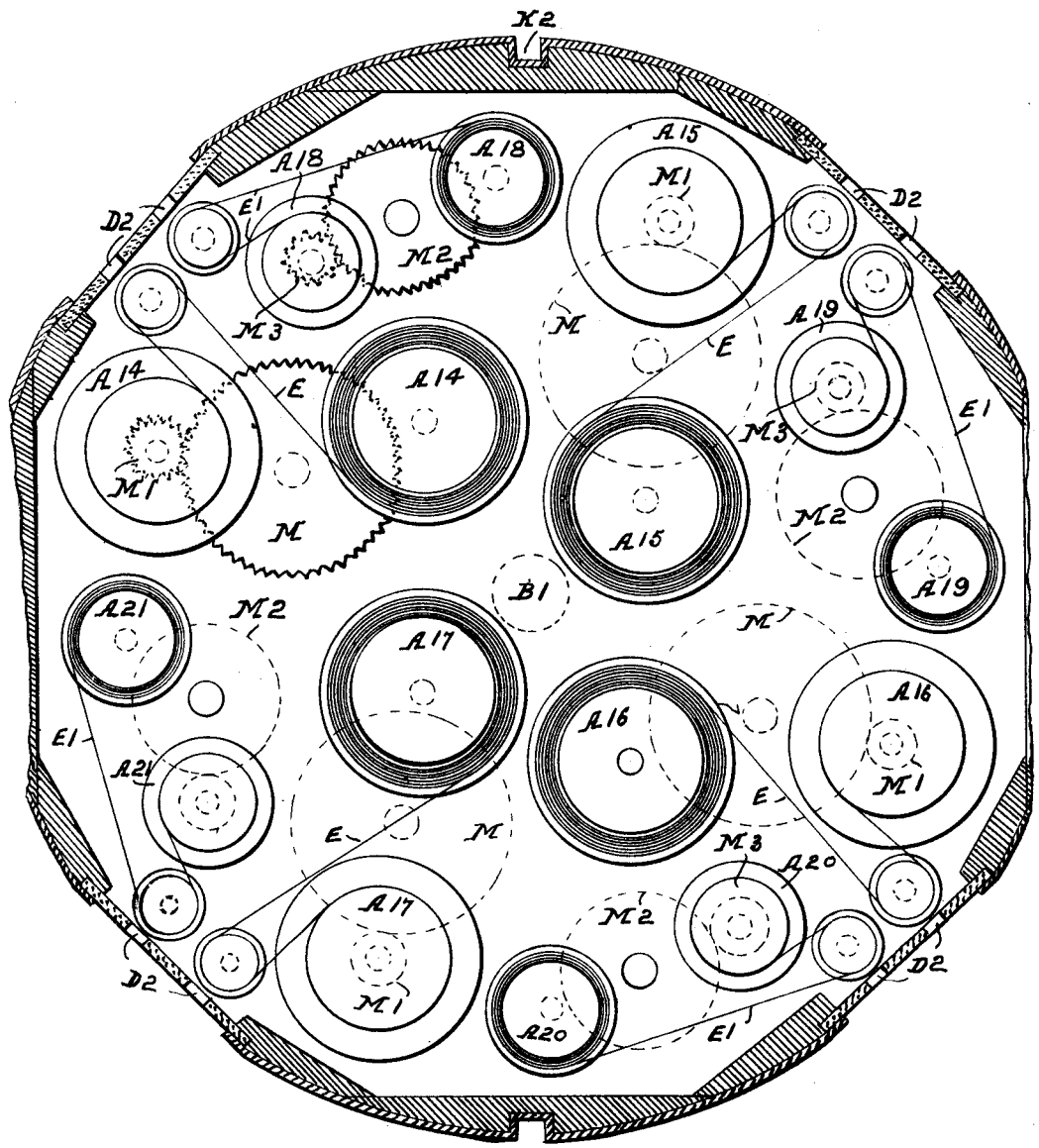

Figure 1 is a sectional and diagrammatic end elevation of an example in which the factorial bands are directly mounted upon the peripheries of rollers. Fig. 2 is a sectional side elevation of detail means for manipulation of the band rollers in such and in some other examples. Fig. 3 is a diagram of a form of gearing. Fig. 4 is a diagrammatic view of an example in which the bands pass between pairs of rollers. Figs. 5 and 6 are, respectively, a vertical section and a side elevation of an exemplary form of indicating gear. Fig. 7 is a plan of an exemplary form of pointer and scaling device. Figs. 8 and 9 are sectional and diagrammatic elevations of two further examples of apparatus in which the bands pass from roller to roller. Figs. 10, 11 and 12, are diagrams of gearing, bands, and rollers, and Figs. 13 and 14 are, respectively, a sectional side and an end elevation of a band tensioning device.

In the example shown diagrammatically in Fig. 1, there are a series of rollers A, $A^1$, $A^2$, $A^3$, $A^4$, $A^5$, bearing bands around their peripheries mounted upon spindles carried in end plates B forming the cage referred to mounted in turn on a spindle $B^1$, the whole being mounted within a casing C having a single sighting slot D along which is traversable a pointer or other device (not shown).

In the example shown diagrammatically in Fig. 4 there are a series of pairs of rollers $A^6$, $A^7$, $A^8$, $A^9$. Passing from one roller to another of each of the pairs is a factor bearing band E, which bands pass mid-way between the rollers over guide bars E, F, (or it might be guide rollers) by which they (the bands) are brought sufficiently near the periphery to be read through the sighting slot. The rollers $A^6$, $A^9$, are mounted in end plates B forming a cage which in turn is carried in a casing as in the foregoing example.

It is often expedient that there be two factorial bands separately adjustable but readable jointly through practically one sighting slot at one time. An example carrying out this requirement is shown in sectional end elevation in Fig. 8. In this example there are two lengthy bands E and two shorter bands $E^1$, the lengthy bands are mounted upon pairs of rollers $A^{10}$, $A^{11}$, respectively, the shorter upon pairs $A^{12}$, $A^{13}$, while intermediate guide rollers $F^1$, $F^2$, $F^3$, $F^4$ to bring the bands up to the periphery for reading are provided. As before, the rollers are all mounted on end plates B forming a cage which is rotatable on trunnions B¹ within an outer casing C having a single sighting position D, while two sighting slots D¹ with their scales D³ are carried on the cage opposite each pair of bands. In this last example there are two sets of bands, each consisting of two, readable together, and either pair of bands may be turned to the sighting position D for use. It may be that more pairs of bands be required—a larger number of pairs is provided in the example (otherwise similar to that just described) shown in Fig. 9. In this case there are four pairs A¹⁴, A¹⁵, A¹⁶, A¹⁷ of greater and four pairs A¹⁸, A¹⁹, A²⁰, A²¹ of lesser bands, while sighting slots D² co-acting with the single sighting position D in the outer case (not shown here) are carried by the cage opposite each pair of bands.

These are exemplary of the manners of arranged bands and rollers in the rotatable cage—obviously the arrangement may be varied to suit particular circumstances, forms, or conditions.

The means for operating the cage, the rollers and the bands are interchangeable with slight variation among the various arrangements of bands and rollers. A simple example of means of operation is shown in Fig. 2 as applied to the first example of roller arrangement shown in Fig. 1, but equally applicable to other arrangements. In this example the cage spindle B¹ has mounted upon its end external to the casing C a band-wheel G bearing a scale G¹ co-acting with a pointer (not shown) on the casing. The scale bears descriptions or the like of the functions of the bands upon the various rollers. One end plate B has formed upon it a cylindrical bush H engaging trunnion-wise a bushed aperture in that end of the casing C and the spindles H¹ of the rollers, A, A¹, A², A³, bear upon their outer ends handwheels H² by which they may be turned. Were this arrangement applied to an apparatus having bands arranged to wind from one to other of pairs of cylinders, of course, only the spindle of one roller in each pair would be provided with a handwheel such as H⁴. Again, instead of a handwheel being provided for each roller to be operated, the rollers to be operated may (as shown diagrammatically in Fig. 3) each have upon its spindle a pinion H², all of which pinions gear with a central pinion H³. Any convenient pointing device and scale may be applied to such an arrangement to indicate the position of the various geared rollers and the bands, but a simple and effective form is shown in Figs. 5 and 6. In this form the pinion H³ is carried upon a spindle J passing out through the trunnion-like part of the cage plate B. External to the plate B the spindle is screwed and engages a nut J¹ formed in a drum J² prevented against rotation relatively to the plate B by pins J³ fixed in a plate securing the spindle against endwise movement and fixed to the plate B and engaging it but free to move endwise. Fixed upon the end of the spindle J is a second drum J⁴ provided with a handle J⁵ by which it and the spindle may be turned. The drum J⁴ bears externally an indicating scale, and there is fixed to the drum J² a pointer J⁶. On rotation of the spindle J the drum J² moves endwise over or from off the drum J⁴, as the case may be, uncovering or covering more or less of the scale upon that drum upon which the pointer J⁶ indicates also. Thus an exact indication of the positions of the various rollers and their bands is given, while further, the drum J² encountering at its extremes of movements either the plate B or the interior of the drum J⁴, as the case may be, prevents over winding of the rollers in either direction—a very necessary measure in the case of pairs of rollers with a band between them.

Means must be provided to arrest and retain the cage in all examples in the various positions with the various bands opposite the single sighting aperture in the outer casing C. Any convenient form of device to this end may be applied. A simple form is shown in Fig. 8. To the outer casing C there is pivoted a pawl lever K provided at its outer end with a handle (not shown) and having a tooth K¹ adapted to engage a series of notches K²—one for each position of the cage. The pawl lever is controlled by a spring K³. In Fig. 8 also and in Fig. 7 is shown a form of band-reading device. This consists of a slotted pointer L through the slot in which the bands are read at the single sighting aperture D. This pointer is pivoted upon a rail L¹ fixed across the front of the machine. The pointer is lifted by a feather L² engaging it. This feather is on a tube L³ on the rail L and is turnable through a small angle thereon to tilt the pointer out of the way when the cage is to be rotated within the casing, which in this instance consists of end plates C within which the cage rotates, and which plates are held together by longitudinal rods Y. To automatically effect this, the tube L³ bears a crank L⁴ connected by a link L⁵ with the lever K, and as the cage cannot be turned until the lever K is depressed, it follows that the pointer L must be raised before the cage moves.

It is expedient where the band passes from roller to roller that the operating means for the sake of speed be geared to the rollers. Thus in Figs. 8 and 9 are pinions M gearing with pinions M¹ on the rollers with bands of greater length, and like pinions M², M³ for the bands of lesser length. The pinions M, M² may be operated by the means shown in Fig. 2, or their positions may be so modified that they may be operated by the means shown in Figs. 3, 5, and 6.

When bands passing from roller to roller are employed, it is, of course, essential that some means be provided for maintaining the band in tension as the winding circumference decreases on one roller and increases on the other. The simplest means is to apply a light brake to each roller, provide each roller with a handle and operate always to wind up the band onto one roller, but such an arrangement is liable to confuse the operator, who, winding by the wrong handle, loosens the band and disorganizes the whole arrangement. A simple tensioning device by which sufficient tension is maintained at all times in the band and by which the band is operated for winding in either direction by one handwheel or equivalent is shown in Figs. 13 and 14. In this example, the roller A is loose upon its spindle P, and there is loose upon a sleeve P¹ on that spindle a disk P² carrying a transmission means such as a sprocket wheel P³. There is provided upon the outer end of the spindle P a handwheel P⁴ for turning it, or it might be, of course, a pinion to be turned through gearing. Between the end flange of the roller A and the disk P² the spindle P is screwed, and there engages with the screwed part a nut R. The nut R has a groove about its periphery engaged by a loose heavy drag ring R¹. Upon the spindle P being turned in one direction or the other, the drag of the ring R¹ causes the nut R to lag behind on the screw and be moved either into contact with the end of the roller A or with the disk P². Thus upon rotating the spindle P in one direction, the roller A is locked to it by the clutch action of the nut R, and upon rotating the spindle in the other direction the disk P² and its transmission means are locked to it. Instead of the drag ring a brake may be applied to the nut. The other roller of the pair form one to other of which the band is wound is, of course, driven from the transmission means on the disk P². Thus, when the spindle is turned in one direction the band is wound up on the one roller and runs freely off the other and vice versa. Light springs such as S are applied to the rollers to give sufficient drag to adequately tension the band.

Various manners of arranging the band and gearing are shown in Figs. 10, 11 and 12. In Fig. 10, the band E is wound in the same direction on the two rollers A, A¹, while a sprocket chain T¹ drives the roller A¹, the nut R and allied parts being upon the spindle of the roller A. In Fig. 11, pinions T², T³ on the two rollers A, A¹ directly intermesh, and the band E is wound oppositely on the two rollers. In Fig. 12, an intermediate pinion T⁴ is placed between the pinions T², T³ and the band E is wound upon the rollers A A¹ in the same direction.

It is apparent that any convenient form of ratchet or other clutch mechanism may be adapted to perform the functions of that described, or that the one roller may be provided with a spring after the manner of a blind roller or any other known manner of tensioning the band may be applied.

What I claim is:—

1. In reckoning and computing apparatus, a supporting casing having end frames, a cage having an end plate peripherally journaled in one of said end frames and forming an end closure for the frame, a spindle fast with said end plate and journaled in the other of said end frames, a hand wheel on the end of said spindle for rotating the cage, factorial devices rotatably supported in said cage and means passing through the end plate of the cage for rotating independently the several factorial devices, substantially as described.

2. In reckoning and computing apparatus, a supporting casing having end frames, a cage having an end plate peripherally journaled in one of said end frames and forming an end closure for the frame, a spindle fast with said end plate and journaled in the other of said end frames, a hand wheel on the end of said spindle for rotating the cage, a band scale on the periphery of said hand wheel for indicating the position of the cage, factorial devices rotatably supported in said cage and means passing through the end plate of the cage for rotating independently the several factorial devices, substantially as described.

3. In reckoning and computing apparatus, a supporting casing, a cage rotatable therein, a series of factorial devices mounted in said cage, in combination with a stop device for holding said cage in observation position, a pointer adjustable longitudinally of the cage and an operative connection between said pointer and stop device for lifting the pointer on the disengagement of the stop device, substantially as described.

4. In reckoning and computing apparatus, a supporting casing, a cage rotating within said casing, and factorial devices carried by said cage, in combination with a rail carried horizontally in front of said cage, a cammed sleeve on said rail, a pointer longitudinally slidable on said sleeve across the face of said cage, a pivoted stop device for halting the cage in observation position and a connection between said stop device and sleeve for lifting the pointer when the cage is freed, substantially as described.

5. In reckoning and computing apparatus, factorial band carrying rollers and winding device therefor, said device comprising a spindle with threaded portion, a working on said threaded portion, a cylinder mounted on one side of said nut and a transmission device on the opposite side of said nut, and a drag device operating on said nut whereby the latter is moved into frictional engagement with the cylinder when the spindle is rotated in one direction and into frictional engagement with the transmission device when the spindle is rotated in the opposite direction, substantially as described.

In reckoning and computing apparatus, having an outer casing with a suitable indicating device, a cage rotatable within the casing, a series of rollers supported in the cage, between each pair of rollers a material band windable from one to the other, means for bringing the band alternately opposite the indicating device, means for holding them there, and means for operating the rollers and tensioning means for each pair of rollers comprising a spindle upon which one of the rollers is free, a screwed part on the spindle, a nut engaging the screwed part, a drag device on the nut, a transmission means loose on the spindle and connecting the second roller of the pair, said nut being interposed between the roller and the transmission means so that upon the rotation of the spindle in one direction or the other said nut is brought into frictional driving engagement with said roller or said transmission means depending upon the direction of rotation, for the purpose described.

In testimony whereof I have signed my name to this specification, in the presence of two subscribing witnesses.

JAMES ROBERTSON.

Witnesses:
　DAVID FERGUSON,
　WILFRED HUNT.

Copies of this patent may be obtained for five cents each, by addressing the "Commissioner of Patents, Washington, D. C."